US010928892B2

(12) United States Patent
Kruzel et al.

(10) Patent No.: US 10,928,892 B2
(45) Date of Patent: Feb. 23, 2021

(54) OPTICAL ENGINE TIME WARP FOR AUGMENTED OR MIXED REALITY ENVIRONMENT

(71) Applicant: Alibaba Technology (Israel) Ltd., Herzliya (IL)

(72) Inventors: Ofer Kruzel, Haifa (IL); Matan Protter, Kiryat Ono (IL); Ori Kotek, Tel Aviv (IL); Chen Goldberg, Herzliya (IL)

(73) Assignee: ALIBABA TECHNOLOGY (ISRAEL) LTD., Herzliya (IL)

( * ) Notice: Subject to any disclaimer, the term of this patent is extended or adjusted under 35 U.S.C. 154(b) by 0 days.

(21) Appl. No.: 16/606,840

(22) PCT Filed: Apr. 26, 2018

(86) PCT No.: PCT/IL2018/050456
§ 371 (c)(1),
(2) Date: Oct. 21, 2019

(87) PCT Pub. No.: WO2018/203324
PCT Pub. Date: Nov. 8, 2018

(65) Prior Publication Data
US 2020/0050264 A1 Feb. 13, 2020

Related U.S. Application Data

(60) Provisional application No. 62/492,616, filed on May 1, 2017.

(51) Int. Cl.
*G06F 3/01* (2006.01)
*G06T 11/00* (2006.01)

(52) U.S. Cl.
CPC .............. *G06F 3/012* (2013.01); *G06T 11/00* (2013.01)

(58) Field of Classification Search
CPC ................................ G06F 3/012; G06T 11/00
See application file for complete search history.

(56) References Cited

U.S. PATENT DOCUMENTS 9,552,632 B2   1/2017  Bak
9,576,397 B2   2/2017  Johansson et al.
(Continued)

FOREIGN PATENT DOCUMENTS

EP   0 955 606 A2   11/1999

OTHER PUBLICATIONS

Lippert, Thomas M., "Display Devices: RS (Retinal Scanning Display)", The Avionics Handbook, chapter 6, 2001, CRC Press LLC.

*Primary Examiner* — Michael Pervan
(74) *Attorney, Agent, or Firm* — Pearl Cohen Zedek Latzer Baratz LLP

(57) ABSTRACT

A device, system, and method for applying time warp in an augmented or mixed reality environment. An image may be rendered corresponding to an estimated head position calculated based on head position and orientation measured at the initial time. Time warp may be independently applied to each sequential one of the plurality of segmented visual units of an image (e.g., color-frames or pixel-groups) to generate a plurality of respective time warp visual units corresponding to a plurality of different respective estimated head position and orientations calculated based on head position and orientations measured at a plurality of different respective sequential times after the initial time. The plurality of time warp visual units may be projected in the sequential order at the augmented or mixed reality device.

20 Claims, 6 Drawing Sheets

(56) References Cited

U.S. PATENT DOCUMENTS

| | | | |
|---|---|---|---|
| 9,652,893 B2 | 5/2017 | Michail et al. | |
| 9,858,637 B1* | 1/2018 | Quach | G06T 1/20 |
| 10,672,197 B2* | 6/2020 | Bates | G06T 19/20 |
| 2017/0243324 A1* | 8/2017 | Mierle | G06T 3/0093 |
| 2017/0345220 A1* | 11/2017 | Bates | G06T 19/20 |
| 2018/0047332 A1* | 2/2018 | Kuwahara | G09G 3/2096 |
| 2018/0061121 A1* | 3/2018 | Yeoh | H04N 13/344 |
| 2018/0081429 A1* | 3/2018 | Akenine-Moller | G06F 3/14 |
| 2018/0144437 A1* | 5/2018 | Kakarlapudi | G06T 17/10 |
| 2018/0165878 A1* | 6/2018 | Khan | G06T 11/60 |
| 2018/0307042 A1* | 10/2018 | Riguer | G06F 3/011 |
| 2019/0027120 A1* | 1/2019 | Croxford | G09G 5/397 |

\* cited by examiner

OPTICAL ENGINE TIME WARP FOR AUGMENTED OR MIXED REALITY ENVIRONMENT

CROSS-REFERENCE TO RELATED APPLICATIONS

This application is a National Phase Application of PCT International Application No. PCT/IL2018/050456, International Filing Date Apr. 26, 2018, claiming the benefit of U.S. Provisional Patent Application No. 62/492,616, filed May 1, 2017 which are hereby incorporated by reference in their entirety.

FIELD OF THE INVENTION

Embodiments of the invention relate to the field of augmented reality (AR) or mixed reality (MR) devices, systems and methods.

BACKGROUND OF THE INVENTION

Virtual reality (VR) generates an entirely virtual scene composed exclusively of simulated graphics covering the user's entire field of view (e.g., displayed on an LCD screen). In contrast, augmented reality (AR) and mixed reality (MR) combines both a real world view and virtual graphics overlaying the real world view. In one example, augmented reality (AR) may employ "see-through" glasses using lenses or optics to view the real world and a digital projector to display virtual graphics such as holograms on the lenses of the glasses. In one example, mixed reality (MR) combines video recorded of the real world with video of virtual graphics (e.g., displayed on an LCD screen).

Virtual reality (VR), augmented reality (AR) and mixed reality (MR) systems all simulate graphics based on a user's head position and orientation. Head position and orientation tracking is based on measurements from sensors such as cameras, gyroscopes and/or accelerometers. There is a computational delay between the time a head position and orientation is measured and the time the corresponding image is rendered and displayed to a user. Accordingly, the head position and orientation is initially calculated for a future point in time when a corresponding image will be displayed. In order to calculate the head position and orientation at a future point in time, some VR, MR and AR systems use prediction models to predict the head position and orientation in the future based on the head's current dynamics (e.g., trajectory, momentum, acceleration, etc.). Prediction however introduces significant errors, which grow exponentially with latency. Hence vendors try to reduce latency to a minimum.

The latency between the initial head movement to the time the corresponding image is displayed to the user is referred to as "motion-to-photon" latency. Motion-to-photon latency gives the appearance of delayed graphic response to head motion and minimizing such latency is a universal goal in VR, MR, and AR systems.

In VR, one method of decreasing motion-to-photon latency is referred to as "time warp." Time warp re-samples the user's head position and orientation and adjusts the most-recently rendered image based on the updated head motion. Time-warping performs a re-projection onto the rendered 2D images as close as possible to the point in time when the image is displayed. Time-warp may correct the 2D image by re-projecting the pixels in the 2D image considering the change of user head position and orientation between the predicted head position and orientation before the rendering by a 3D rendering engine and the user's new head position and orientation at the point of the re-projection. The re-projection typically assumes a certain depth for the pixels relative to the users. The depth may be calculated as a per pixel depth by using a rendering engine depth buffer or "Z buffer," a reference plane assumed to contain all pixels, or a separate reference plane for each object at a different distance.

Time warp, though suited for VR, often causes problems in AR and MR environments. Time warp adjusts the image to a new head position and orientation that may uncover hidden or undefined areas occluded in the field of view of the previous head position and orientation. These uncovered areas may form black or no-data regions, which are quite noticeable and unacceptable. To fill in these no-data regions, VR systems typically copy graphics from adjacent regions, translating, rotating and extrapolating graphics in these occluded areas. This extrapolation may cause a "drifting" effect, in which an object appears to drift from side-to-side as the user rotates their head. Whereas in VR, the entire field of view is time warped and so the entire scene drifts together, in AR and MR only the simulated objects drift while the real world objects remain stationary causing a splitting or separating effect between real and simulated objects. These limitations of conventional time warping, though acceptable in VR, cause a noticeable problem and are not suited for AR and MR environments.

Further, AR and MR typically require a significantly higher frame rate and lower latency than VR, putting additional burden on time warp engines. In VR, a user's entire field of view is simulated so delays are less pronounces than in AR and MR. The current acceptable motion-to-photon latency in VR is approximately 20 ms. In "see-through" AR devices, however, the display is transparent and the user sees simulated graphics overlaid on the real world. In MR devices, the real world and virtual graphics are also combined. The juxtaposition of simulated graphics with real-world objects in AR and MR magnifies latency in the graphics by contrast with the real-world and thus motion-to-photon latency is more noticeable in AR and MR than in VR. Typical acceptable VR latencies are often insufficient in AR and cause a feeling of "judder" where graphic objects tend to lag behind real world objects on display. The current acceptable motion-to-photon latency in AR and MR is less than 6 ms.

Current solutions apply time warp each time a new 2D image is rendered, for example, 60-90 times per second. In some AR and MR systems, the 2D image may be divided into separate color-frames displayed at a refresh rate of e.g. 8 color-frames per image, yielding an AR or MR projection rate of around 480-720 times per second. In some AR and MR systems, the 2D image may additionally or alternatively be divided into groups of pixels that are individually displayed at a rate of e.g. hundreds or thousands of pixel-groups per image, yielding an AR or MR projection rate of thousands to millions of times per second. The current time warp refresh rate of 60-90 times per second is thereby significantly delayed relative to AR or MR refresh rates, causing distortions such as jumps or jitter.

Accordingly, there is a need in the art to implement time warp in an AR or MR environment with sufficiently high frequency and low latency and that overcomes the aforementioned problems of drift, jitter and judder and other discrepancies between real-world optics and simulated graphics in the AR or MR environment.

SUMMARY OF EMBODIMENTS OF THE INVENTION

According to some embodiments of the invention, there is now provided systems, devices and methods that overcome the aforementioned problems in the art by independently applying time warp to each individual color-frame, pixel-group, and/or any other visual unit, in an AR or MR environment, for example, at the frequency of the color channel refresh rate (e.g., 8 color frames per image) or at the frequency of the pixel display rate (e.g., thousands to millions of times per second). This new AR/MR time warp frequency (e.g., 480-720 times per second for color-frame projections or thousands to millions of times per second for pixel-group projections) is significantly greater than typical VR time warp refresh rate (e.g., 60-90 times per second). In addition, this new AR time warp frequency may reduce the motion-to-photon latency to (e.g., 4.5-5.5 milliseconds (ms)) less than a threshold time acceptable in AR/MR environments (e.g., less than 6 ms).

According to some embodiments of the invention, head position and orientation data may be received from sensors operably connected to an augmented or mixed reality device for measuring head position and orientation at an initial time. An image may be rendered corresponding to an estimated head position calculated based on head position and orientation measured at the initial time. Time warp may be independently applied to each sequential one of the plurality of segmented visual units of an image (e.g., color-frames or pixel-groups) to generate a plurality of respective time warp visual units corresponding to a plurality of different respective estimated head position and orientations calculated based on head position and orientations measured at a plurality of different respective sequential times after the initial time. The plurality of time warp visual units may be projected in the sequential order at the augmented or mixed reality device.

According to some embodiments of the invention, time warp may be implemented in an AR or MR environment via a multi-stage approach. In a first stage, images rendered by a 3D rendering engine may be stored, for example, in a buffer. In a subsequent stage, before displaying each color-frame, pixel-group, and/or any other visual unit, each individual sequential color image, pixel-group, and/or any other visual unit may undergo a separate color, pixel-group, or visual unit specific time warp re-projection for a subsequent projection time. The sequence of color, pixel-group and/or visual unit projections are thus sequentially displayed (e.g., red frame, green frame, blue frame, (repeat) . . . for color frames and pixel-group1, pixel-group2, . . . for pixel-group projections) such that each subsequent color, pixel-group and/or visual unit is independently time-warped according to a respective sequential head position and orientation recorded at a sequentially advanced time (e.g., t1, t2, t3, . . . , respectively).

BRIEF DESCRIPTION OF THE DRAWINGS

Specific embodiments of the present invention will be described with reference to the following drawings, wherein.

Figure 1A:
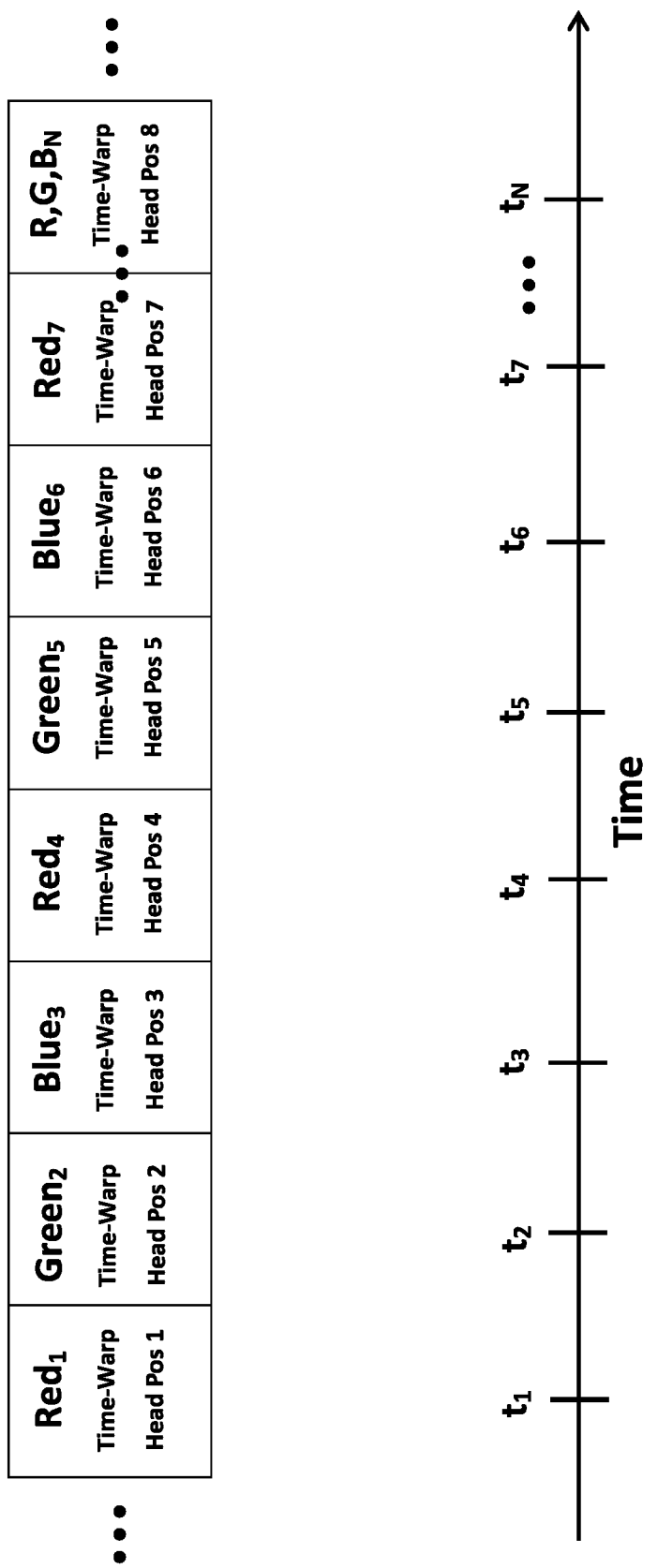
FIG. 1A is a schematic illustration of an example sequence of time warp color-frames in an augmented or mixed reality environment in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Figure 1B:
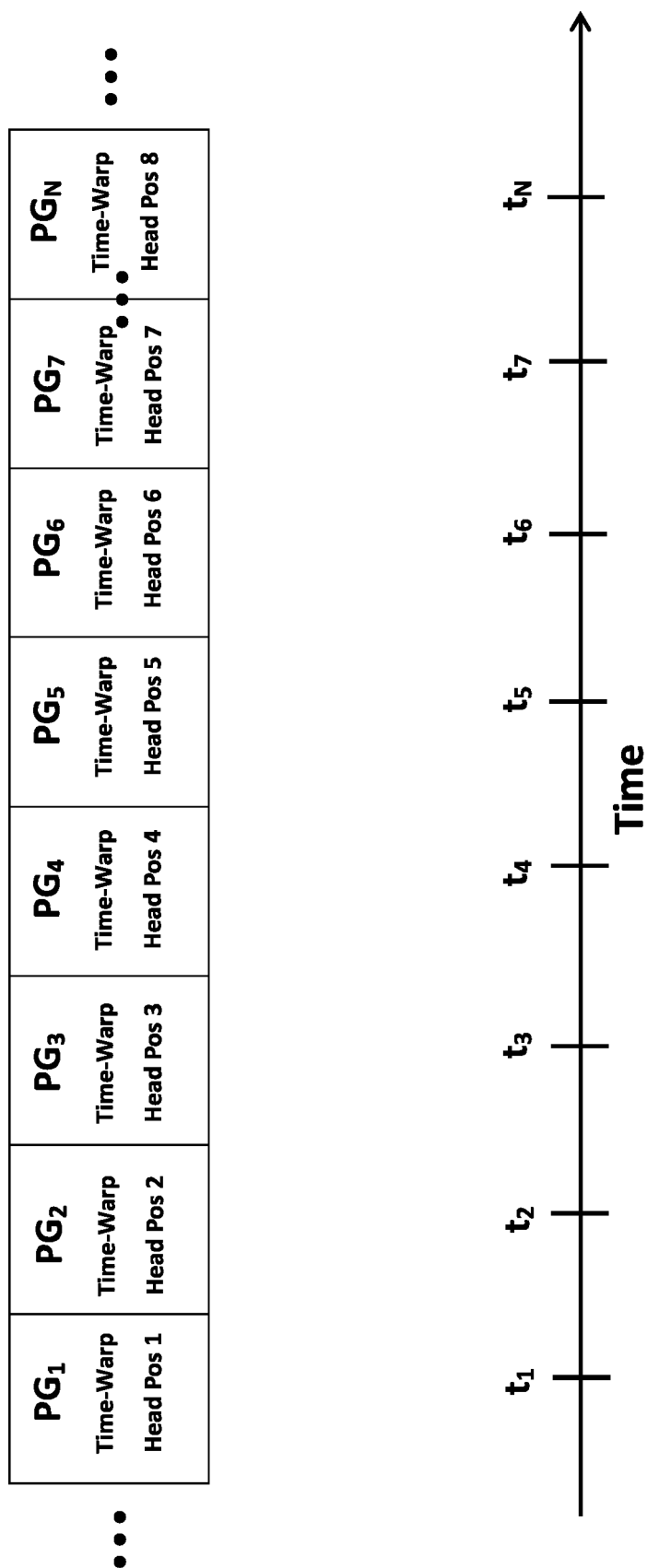
FIG. 1B is a schematic illustration of an example sequence of time warp pixel-group projections in an augmented or mixed reality environment in accordance with an embodiment of the invention.

VR projectors display consolidated images combining all color components (e.g., RGB or CMYK) and all pixels into a single projection. In contrast, AR and MR projectors typically segment each image into multiple monochromatic color-frames or pixel-groups, such that, each image is represented as a composite of multiple color-frames (e.g., red-frame, green-frame and blue-frame for RGB images) or pixel-groups (e.g., each sequential set of an integer number (N) of pixels). AR/MR projectors display the multiple color-frames or pixel-groups separately into a user's field of view in rapid succession to give the appearance of a full-color and fully-pixelated image. Each color-frame may project only the image data for that single color or color spectrum and different color-frames are displayed at different sequential times. For example, a sequence of RGBRGBRGB . . . color-frames are projected at times t1, t2, t3, . . . , respectively, as shown in FIG. 1A. In some embodiments, the sequence is cycled through multiple times at a color refresh rate of (N) (e.g., 8 or 16) color-frames per image. A color-frame or color sub-frame may refer to only a sub-portion or part of an image composed of a single color or color spectrum (e.g., a red frame), e.g., excluding chromatic information for all other colors or color spectrums. Each pixel-group projection may display only the image data for the pixels in that single pixel-group, and different pixel-group are displayed at different sequential times. For example, a sequence of pixel-group (PG)1, PG2, . . . , PGN are projected at times t1, t2, t3, . . . tN, respectively, as shown in FIG. 1B. In augmented or mixed reality glasses or headset applications, an image, frame, color-frame or pixel-group may refer to a double-image, double-frame or double-pixel-group with two images or pixel-groups displayed in adjacent lenses in the respective views of the user's two eyes to create the appearance of three-dimensional vision. In general, an image, frame, color-frame, or pixel-group may refer to an N-part image or pixel-group (e.g., 4-part) displayed on any integer N-sided (e.g., 4-sided) surface to create the appearance of a three-dimensional image or hologram.

Some embodiments of the invention take advantage of the segmentation of frames into multiple color-frame or pixel-group parts in AR or MR systems. Whereas each image is represented as a single frame in VR and can only update all colors and pixels in the frame as a whole, in AR or MR systems each image may be divided into multiple color-frame or pixel-group parts that may be independently processed. Some embodiments of the invention time warp each color-frame or pixel-group independently so that each subsequent color-frame or pixel-group displayed in a sequence is associated with a head movement at a relatively more recent time relative to the prior color-frame or pixel-group. Accordingly, such embodiments produce lower motion-to-photon latency information, for example, that is time warped at the frequency of the refresh color rate or pixel projection rate in AR and MR systems, as compared to a single time warp per image in current VR systems.

Reference is made to FIGS. 1A and 1B, which schematically illustrates an example sequence of time warp color-frames or pixel-groups in an augmented or mixed reality environment according to an embodiment of the invention. FIG. 1A shows a sequence of RGB color-frames, although any other color or color spectrum frames (e.g., CMYK) may also be used. FIG. 1B shows a sequence of N pixel-groups, in which any number, size and/or dimensions of pixel-groups may be used.

In FIG. 1A, an image is segmented into a sequence of an integer number N of (e.g., 8) sequentially displayed color-frames. All N segmented color-frames may initially depict the same scene or graphics of the single image, but for different colors, cycling through series of red-green-blue color-frames. According to an embodiment of the invention, a process or processor may execute N separate time warp corrections for the N respective color-frames segmented from the image. The N sequential time warps may adjust the N color-frames based on N sequentially updated head position and orientations estimated to occur at N display times t1, t2, t3, . . . , tN, respectively. The time warp process may input color-frames (e.g., three color frames for RGB images or four color-frames for CMYK images) all depicting the same scene corresponding to a head position and orientation at an initial display time t1 (e.g., estimated based on an initial head measurement time t0 prior to rendering the initial image) and may output N color-frames that all (or a plurality of which) depict different scenes corresponding to the different head position and orientations at respective times t1, t2, t3, . . . , tN (e.g., estimated based on time warped head position and orientations measured at times t1-ε, t2-ε, t3-ε, tN-ε, where ε is the time warp calculation duration, such as, 4.5-5.5 ms). In some cases, two or more color-frames may depict the same scene if the measured head position and orientation does not change between color refresh times ti and ti+1.

In one example, a subsequent color-frame (e.g., Green2 color-frame) may be time warped according to a more recent head position and orientation (e.g., measured at a relatively later time t2-ε to estimate motion for projection time t2) relative to a previous sequential color-frame (e.g., Red1 color-frame) time warped at a previously measured head position and orientation (e.g., measured at a relatively earlier time t1-ε to estimate motion for projection time t1).

In various embodiments, the number of segmented and independently time-warped color-frames for a single image may be, for example, a multiple of the number of colors used (e.g., three or a multiple of three for RGB images or four or a multiple of three for CMYK images) and/or a multiple of the color refresh rate (e.g., any integer number N, such as, 8 or 16). Accordingly, AR/MR time-warping may reduce latency as compared to VR time-warping by a multiple three, four, or any integer number N.

In FIG. 1B, an image is segmented into a plurality of an integer number N of sequentially displayed pixel-groups (e.g., a 1280×720 pixel image may be segmented into 1280×1 pixels-group lines or 14,400 8×8 pixel-squares). Each pixel group may have integer number (P×Q) dimensions. In various embodiments, the number (N) and dimensions (P×Q) of the pixel-groups may be fixed and constant or may be dynamically adjusted, for example, based on computational resources available (e.g., increasing or decreasing the number N or resolution when more or less resources are available, respectively) or speed of head movements (e.g., increasing or decreasing the number N or resolution when head movement increases or decreases, respectively). Dynamically adjusting pixel-group size, number or resolution may avoid using computational resources that provide minimal gain (e.g., no head movement or overburdened computer) to allocate those resources for instances that provide significant gains (e.g., increased head movement or when computer resources are available) to provide overall faster and more accurate image rendering and time warping.

Each of the N segmented pixel-groups may individually depict a different portion of the single image, that composed or cycled through together, depict the entire image. According to an embodiment of the invention, a process or processor may execute N separate time warp corrections for the N respective pixel-groups segmented from the image. The N sequential time warps may adjust the N pixel-groups based on N sequentially updated head position and orientations estimated to occur at N display times t1, t2, t3, . . . , tN, respectively. The time warp process may input N pixel-groups of an image corresponding to a head position and orientation at an initial display time t1 (e.g., estimated based on an initial head measurement time t0 prior to rendering the initial image) and may output N pixel-groups that all (or a plurality of which) depict different scenes corresponding to the different head position and orientations at respective display times t1, t2, t3, . . . , tN (e.g., estimated based on time warped head position and orientations measured at times t1-ε, t2-ε, t3-ε, . . . , tN-ε, where ε is the time warp calculation duration, such as, 4.5-5.5 ms). Whereas the input set of pixel-groups are rendered using estimations based on measurements at relatively earlier time t0, the time warp output set of pixel-groups are rendered using estimations based on head measurements at relatively later times t1-ε, t2-ε, t3-ε, . . . , tN-ε, thereby decreasing motion-to-photon latency and improving motion estimation accuracy.

In one example, a subsequent pixel-group (e.g., PG2) may be time warped according to a more recent head position and orientation (e.g., measured at a relatively later time t2-ε to estimate motion for projection time t2) relative to a previous sequential pixel-group (e.g., PG1) time warped at a previously measured head position and orientation (e.g., measured at a relatively earlier time t1-ε to estimate motion for projection time t1).

In various embodiments, the number N of segmented and independently time-warped pixel-groups for a single image may be, for example, a multiple of (e.g., hundreds or thousands of) the number of pixels in the image. Accordingly, AR/MR time-warping may reduce latency as compared to VR time-warping by a multiple of the number of pixels in an image (e.g., hundreds or thousands).

In some embodiments, an image may be segmented into both color-frames and pixel-groups within each color-frame (e.g., $PG1_{RED}$, $PG1_{GREEN}$, $PG1_{BLUE}$, $PG2_{RED}$, ... ), combining the segmentation and time-warping embodiments described in reference to FIGS. 1A and 1B. Combining these segmentation and time-warping embodiments may compound the benefits of these embodiments, further decreasing latency and improving accuracy. In general, an image may be segmented into any type of visual unit, such as, groups of frames, pixels, colors, compression frames such as inter frames or intra frames or portions thereof, etc., that may be independently and sequentially time warped (e.g., replacing the color-frame and pixel-groups of FIGS. 1A-1B with any N visual units of an image such as lines of pixels representing full color (RGB) or a single color).

Figure 2:
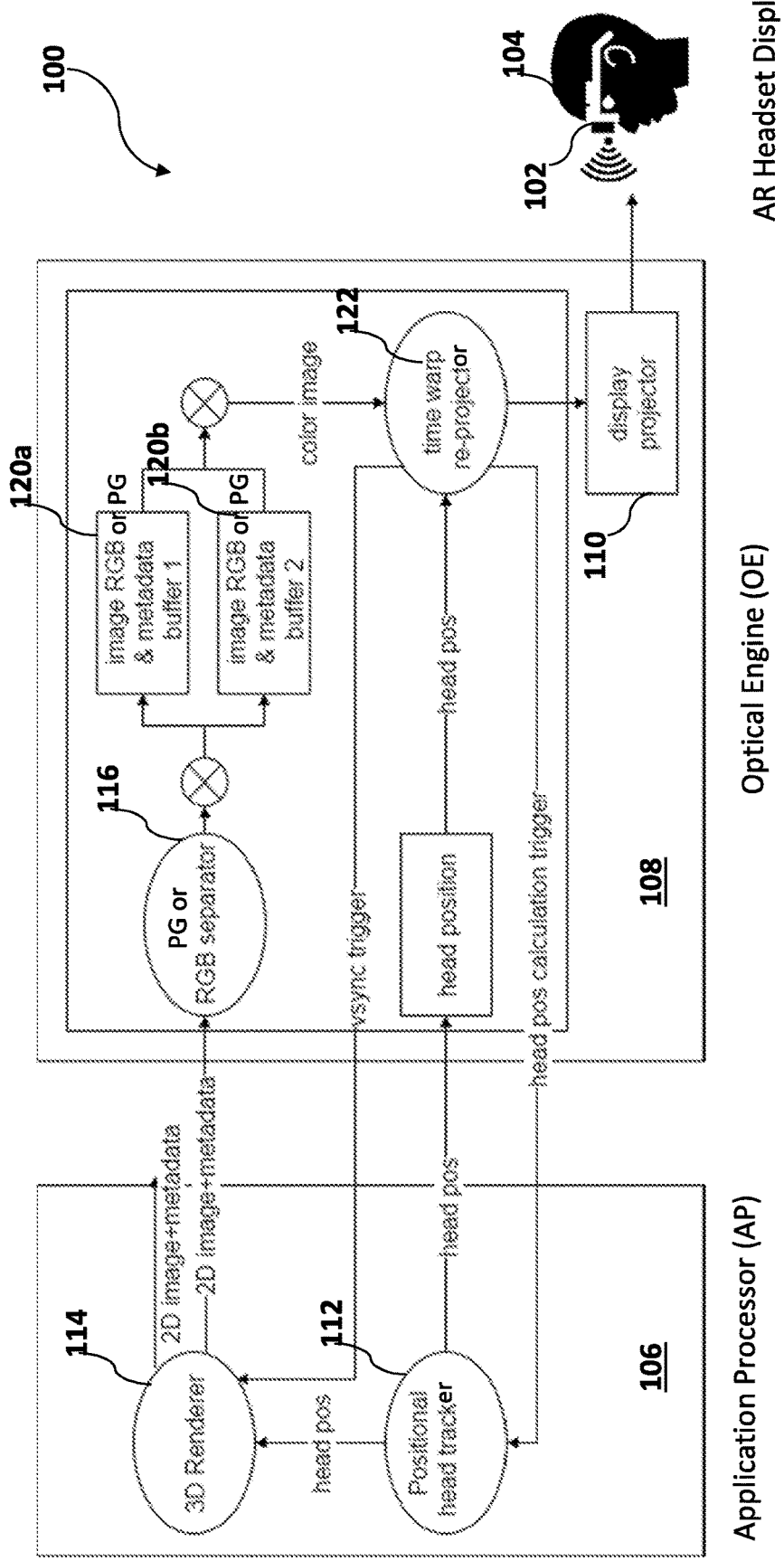
FIG. 2 is a schematic illustration of an example system for applying time warp to images in an augmented or mixed reality environment in accordance with an embodiment of the invention.

The data structures of FIGS. 1A and 1B may be generated, stored, processed and/or projected by the components of the system in FIG. 2 or other systems.

Reference is made to FIG. 2, which schematically illustrates an example system 100 for applying time warp to images in an augmented or mixed reality environment according to an embodiment of the invention. System 100 may include an augmented or mixed reality device 102. Augmented or mixed reality device 102 may be "see-through," in which a portion of the field of view is the real-world (e.g., viewed through standard optics or lenses) and a portion of the field of view comprises digitally rendered simulated graphics (e.g., generated and projected by augmented or mixed reality device 102) or may be a fully digitized display. Augmented or mixed reality device 102 may be a AR or MR device including, but not limited to, "see-through" glasses, headsets, contact lenses, holograms, screens, prisms, helmets, kiosks, projectors, or any other see-through material or device.

Augmented or mixed reality device 102 may include, or may be operatively connected to, one or more sensors 104 mounted onto an augmented or mixed reality headset for measuring real-time headset position and orientation and/or dynamics information. Sensors 104 may include any device configured for sensing information related to the positions and orientation or dynamics of augmented or mixed reality device 102. Example sensors 104 include one or more cameras, depth sensors, magnetometers, gyroscopes, accelerometers, inertial measurement units (IMUs) and/or any other texture tracking and distant measuring sensors.

Augmented or mixed reality device 102 may include one or more application processors (AP) 106 and/or one or more additional co-processor(s), one or more optical engines (OE) 108, and one or more display projectors 110.

Application processor (AP) 106 or co-processor(s) may receive head position information obtained from sensors 104 at an initial time (e.g., time t0 discussed in reference to FIGS. 1A and 1B). AP 106 may include a head position and orientation tracker 112 to estimate a head position at a future image projection time (e.g., time t1 discussed in reference to FIGS. 1A and 1B). AP 106 may include a 3D image renderer 114 to render 2D images (e.g., double-images, one image for each eye according to the eye's relative position, and optionally metadata of image features such as pixels depth or re-projection reference plane position) corresponding to the estimated head position and orientation at the future time of display (e.g., t1). In embodiments employing color-frame segmentation, AP 106 may output each rendered image to the OE 108 internal buffer 120 every rendering cycle of the 3D renderer 114 as a full-color image that is segmented by color separator 116 or as separate color-frames (e.g., red, green and blue) while the display projector 110 at any given time projects a specific color-frame after being time warped at a time warp re-projector 122 based on the 2D image in the OE internal buffer 120. In embodiments employing pixel-group segmentation, AP 106 may output each rendered image to the OE 108 internal buffer 120 every rendering cycle of the 3D renderer 114 as a full-pixel image that is segmented by pixel separator 116 or as separate pixel-groups (e.g., PG1, PG2, ... ) while the display projector 110 at any given time projects a specific pixel-group after being time warped at a time warp re-projector 122 based on the 2D image in the OE internal buffer 120. AP 106 may reiterate this procedure for each image to output a continuous stream of images, e.g., at an image rate of 60-120 times per second or any other frequency supported by the display.

Optical engine (OE) 108 may receive the stream of 2D images from AP 106 (e.g., receiving a new image 60-120 times per second). OE 108 may include a color or pixel separator 116 to segment each 2D image into a plurality of color-frames (e.g., three RGB-frames shown in FIG. 1A or four CMYK-frames) or a plurality of pixel-groups (e.g., N pixel-groups shown in FIG. 1B). In embodiments employing color-frame segmentation, OE 108 may cycle through the color-frames at a refresh color rate to output and project a number of (N) color-frames per rendered image. The refresh color rate may be an adjustable parameter (e.g., set to a fixed value such as 8, 16, or 32, or a dynamic value based on or proportional to the amount of head motion or scene change or display parameters). Each segmented color-frame may depict a single color or color spectrum portion of the same rendered image corresponding to the head position and orientation predicted to occur at the initial time of display (e.g., $t_1$). The plurality of color-frames may be sorted in a sequential order. In some embodiments, when the color refresh rate yields a greater number N of color-frames (e.g., 8) than colors (e.g., three for RGB), the same color-frame (e.g., red-frame) may be re-used multiple times for different time warps (e.g., Red1, Red4, and Red7 frames in FIG. 1A time warped corresponding to head position and orientations predicted for times t1, t4, and t7, respectively). The display frequency of the color-frames may be equal to the product of the image rate and the color refresh rate (e.g., yielding values upwards of 60 images per second x 8 color-frames per image=480 display cycles or approximately 2 ms for each color channel). In embodiments employing pixel-group segmentation, OE 108 may cycle through the pixel-groups at a projection rate to output and project all (N) pixel-groups in the rendered image. The projection rate may be a fixed or adjustable parameter (e.g., N×image rate). Each segmented pixel-group may depict a single portion or coordinates of the same rendered image corresponding to the head position and orientation estimated based on an initial measurement time (e.g., $t_0$) to occur at a future projection time (e.g., $t_1$). The plurality of pixel-groups may be sorted in a sequential order.

Optical engine (OE) 108 may include one or more active buffers 120a or 120b outputting color-frames or pixel-groups of a current image being displayed in a current iteration and one or more standby buffers 120a or 120b inputting color-frames or pixel-groups of a next image to be displayed in a next iteration. When a full image display cycle or iteration (including all color cycles or pixel-groups) is completed, the next image is incremented to the current image and the active and standby buffers 120a and 120b are switched. The previously designated standby buffer (having loaded the next image in the previous iteration) becomes the new active buffer and outputs the loaded image in the current iteration. Conversely, the previously designated active buffer (having evacuated its memory of the previously displayed image) becomes the standby buffer and rebuilds its memory by loading color-frames of a new image to be played in the next iteration.

A new image display cycle or iteration is triggered by OE 108 sending a signal (e.g., a video synchronization (vsync) trigger) to AP 106 and/or 3D renderer 114. AP 106 then starts rendering a new image by the 3D renderer 114, which outputs a set of new 2D (e.g., double) images. Before a new image is transferred to OE 108, head position and orientation tracker 112 calculates a new head position and orientation based on latest sensor 104 data. Using the difference between the head position and orientation estimated based on sensor data measured at the initial time (e.g., $t_0$) (e.g., before 3D rendering) and a current head position and orientation at a subsequent time (e.g., $t1-\varepsilon$) (e.g., after 3D rendering), time warp re-projector 122 applies a time warp to a color-frame or pixel-group to generate a time warped color-frame or pixel-group that is transferred to display projector 110. Head position and orientation tracker 112 may calculate a new estimated head position and orientation each time the time warp re-projector 122 sends a head position and orientation calculation trigger to head position and orientation tracker 112. The new head position and orientation trigger and/or measurement for each time warp color-frame may occur at a predetermined time warp rendering increment (e.g., $\varepsilon$, such as, 4.5-5.5 ms) prior to the projection time for the individual time warp color-frame (e.g., t1, t2, . . . , tN). The head position and orientation calculation trigger may be, for example, a hardware interrupt command that may be sent to AP 106. Time warp re-projector 122 repeats the time warp process up to (N) times for the (N) respective time warp color-frames or pixel-groups displayed per image.

Display projector 110 displays each image as a rapid succession of the (N) time warped color-frames or pixel-groups in sequential order (e.g., 8-16 color-frames per image at 60-120 frames per second=upwards of 480 independently time warped color-frames per image).

Although shown as separate components in FIG. 2, augmented or mixed reality device 102, application processor (AP) 106 and optical engine (OE) 108 may be implemented as a single integrated hardware device, or each unit may be separated into multiple different devices.

Augmented or mixed reality device 102, AP 106, OE 108, display projector 110, head position and orientation tracker 112, 3D renderer 114, separator 116, and time warp re-projector 122, may include one or more controller(s) or processor(s) for executing operations and one or more memory unit(s) for storing data and/or instructions (e.g., software) executable by a processor. Processor(s) may include, for example, a central processing unit (CPU), a digital signal processor (DSP), a microprocessor, a controller, a chip, a microchip, an integrated circuit (IC), or any other suitable multi-purpose or specific processor or controller. Augmented or mixed reality device 102, AP 106, OE 108, display projector 110, head position and orientation tracker 112, 3D renderer 114, separator 116, and time warp re-projector 122, may retrieve and/or store data and/or execute software according to computer code stored in one or more memory unit(s), such as, buffer(s) 120a and b. Memory unit(s) may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 3:
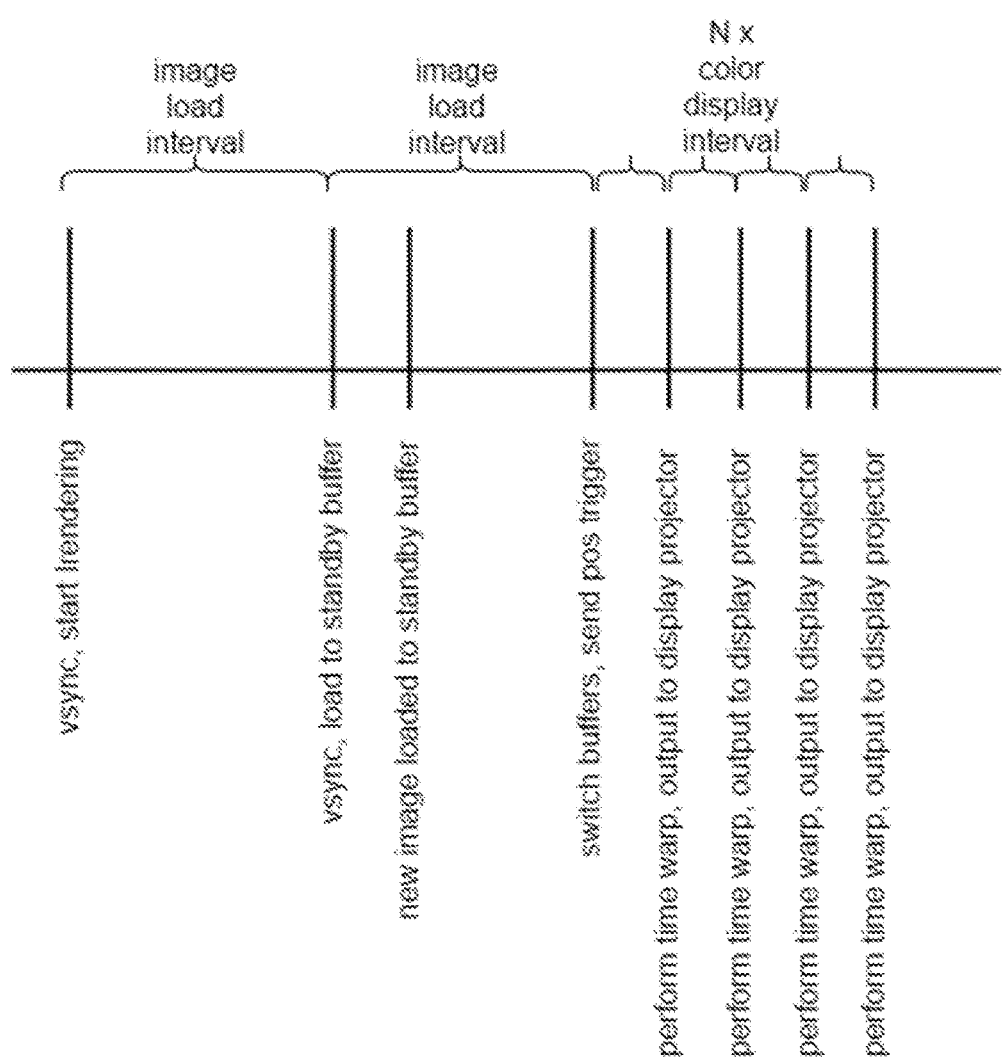
FIG. 3 is a schematic illustration of a timing diagram for applying time warp to an image in an augmented or mixed reality environment in accordance with an embodiment of the invention.

Reference is made to FIG. 3, which schematically illustrates a timing diagram for applying time warp to an image in an augmented or mixed reality environment in accordance with an embodiment of the invention. The operations shown in FIG. 3 may be executed by the components of the system in FIG. 2 or other systems.

The timing diagram depicts a sequence of events for displaying a single image and may be repeated for each sequential image in an AR image stream. The sequence of events depicted in the timing diagram may be initiated by a trigger signal (e.g., vsynch) e.g., transmitted by time warp re-projector (e.g., 122 of FIG. 2) and/or received by 3D renderer (e.g., 114 of FIG. 2). The trigger signal may cause the 3D renderer to render a 2D image (optionally with metadata of image features) based on initial head position and orientation information (e.g., measured at initial time to). The image may be rendered as individual color-frames, pixel-groups, or as a full-color and/or fully-pixelated image that is segmented into color-frames or pixel-groups by a separator (e.g., 116 of FIG. 2). Next, the color-frames or pixel-groups may be loaded into a standby buffer (e.g., 120a or 120b of FIG. 2). Next, after a previous image is output from an active buffer (e.g., 120b or 120a, respectively, of FIG. 2), the system may switch standby buffer and active buffer (e.g., 120a and 120b of FIG. 2). Next, the newly designated active buffer may sequentially output a sequence of N color-frames (e.g., cycling through the ordered sequence of stored color frames, such as, RGB-frames) or pixel-groups (e.g., incrementing each sequentially positioned pixel-group). Next, at times $t1-\varepsilon$, $t2-\varepsilon$, $t3-\varepsilon$, $tN-\varepsilon$, a time warp projector (e.g., 122 of FIG. 2) may execute N independent sequential intervals of time warp for the N sequential color-frames or pixel-groups to be projected at N sequential times t1, t2, t3, . . . tN, respectively.

Other operations may be added, some operations may be omitted, and the order of operations may be rearranged.

Motion-to-Photon Latency: Some embodiments of the invention may improve motion-to-photon latency, for example, as compared to VR time warp displays and/or standard AR/MR displays. Following is an example latency breakdown of one embodiment of the invention when time warp re-projection is applied just before displaying each color-frame, pixel-group or other visual unit. In this example, the resulting latency may be approximately 4.5-5.5 ms.

Inertial measuring unit (IMU) internal low pas filter (LPF)=approximately 1-2 ms IMU freq. e.g. in 1000 Hz=less than or equal to 1 ms, on average 0.5 ms New head position and orientation calculation=approximately 1 ms Time warp re-projection=approximately 1 ms Time till middle of channel display=2 ms/2→approximately 1 ms Embodiments of the invention may achieve other motion-to-photon latencies. These values are provided only as examples.

Figure 4:
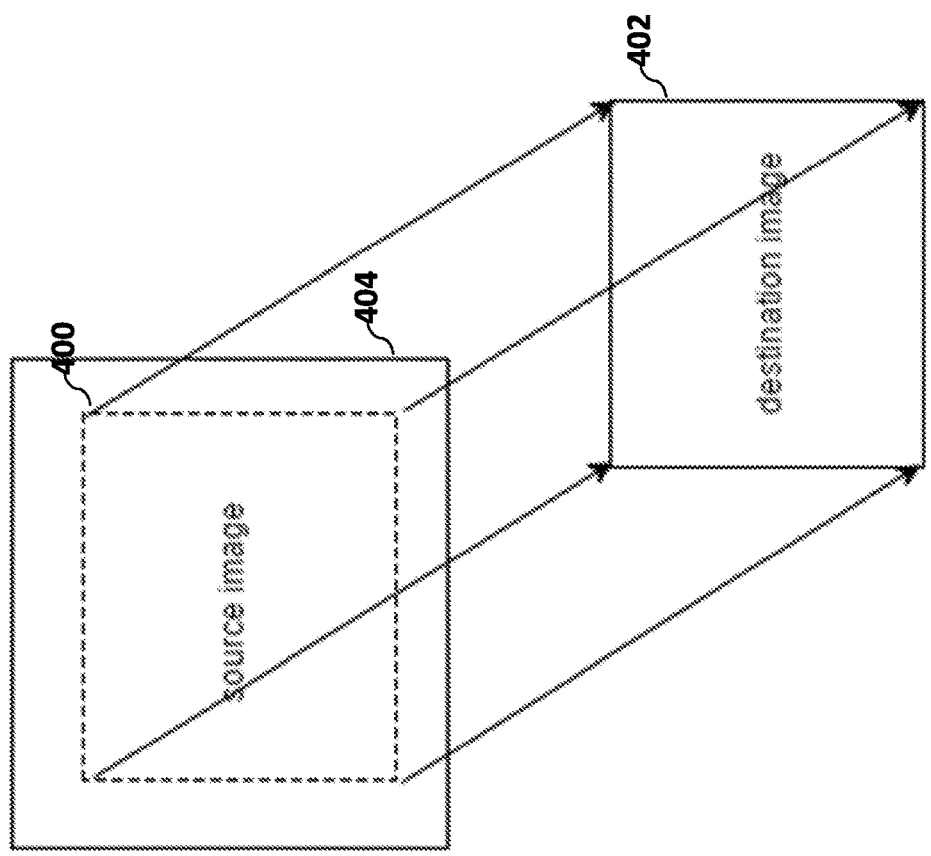
FIG. 4 is a schematic illustration of example data structures for minimizing or eliminating no-data regions in time warped images in accordance with an embodiment of the invention.

Time Warp Reference Plane: Time warp re-projection may be calculated in some embodiments using a distance from each pixel to the user. In one embodiment, the time warp re-projector (e.g., 122 of FIG. 2) may use local reference planes, one per each object or hologram defining the distance of the pixels related to that object or hologram from the user. A display processor (e.g., OE 108 of FIG. 2) may receive meta-data with each rendered image. The meta-data may include a list of image features such as polygons or rectangles, e.g., represented via corners. The time warp projector may transform the image features via time warp re-projection from an initial source position and orientation to a destination position and orientation as well as imaging pre-defined image border margins in order to handle missing source pixels due to head movement during the time passed between the original 3D rendering and the time-warp calculation (e.g., as shown in FIG. 4). The time-warp re-projector may calculate the source pixel corresponding to each destination pixel. The time-warp re-projector may initially search for and apply an optimal transformation for the list of hologram rectangles or other image features. A destination image location with no corresponding pixels may remain blank (transparent in AR/MR headsets or glasses).

Head Movement Image Boundaries Handling: When the time warp re-projector (e.g., 122 of FIG. 2) applies time warp, black or no-data areas may form when areas that were originally occluded before the time warp (e.g., having no original pixels visible) are revealed by the time warp adjustment. Examples of this effect occur, for example, near the image borders. Some VR systems fill-in these black areas by copying or extrapolating neighboring patterns, which often results in occlusion inaccuracies. Though sometimes acceptable in entirely digital VR images, occlusion inaccuracies are magnified and generally less acceptable in mixed digital and real-world AR images because digital objects begin to separate from their real-world counterparts.

Reference is made to FIG. 4, which schematically illustrates example data structures for eliminating (or minimizing) no-data regions in time warped images according to an embodiment of the invention. To reduce such no-data or black-out regions near borders of time warp destination images 402, in some embodiments of the invention, an image renderer (e.g., 3D renderer 114 of FIG. 2) may add an additional buffer region or border 404 to an original source image 400. The additional border 404 may extend the image to be wider than the field of view corresponding to the head position and orientation at the initial time, which may be used to fill in missing image data initially occluded in the rendered image and revealed by the time warp. The size of the added border 404 may be based on a measured head movement speed and a time warp delay (e.g., the time passed from the start of 3D rendering of the original image 400 to the time when the image is time warped or displayed). The dimensions of the added border 404 may be symmetric or asymmetric and may be added to one or more (e.g., all or less than all) sides of the original image 400.

For example, the size of the border is calculated as a function of (a maximum speed change)*(time between the head position and orientation calculation and display). In one example, the maximum speed change is 250 degrees per second and the time warp delay from original time of the head position and orientation (e.g., 6DOF) calculation till display, assuming the head position and orientation is calculated at the middle of the display interval=3D rendering time+display interval/2=16.7+16.7/2 ms, which is approximately 25 ms. The border in this example is thereby calculated to be 250 deg/sec*0.025 sec=6 degrees. Accordingly, the added border 404 may have a dimension corresponding to a 6 degree head motion e.g., in all dimensions of the image (on all sides).

In some embodiments, an image renderer (e.g., 3D renderer 114 of FIG. 2) may generate original source image 400 to have a higher resolution (e.g., a greater number of pixels per image) than the resolution of the screen onto which the images are projected (e.g., in an augmented or mixed reality headset 102 of FIG. 2). The extra resolution may provide additional information to fill in or better estimate pixels in low or no data (e.g., black-out) regions in time warp destination images 402 (e.g., regions occluded in the source image 400 that are revealed by the time warp, such as, near edges of objects).

Figure 5:
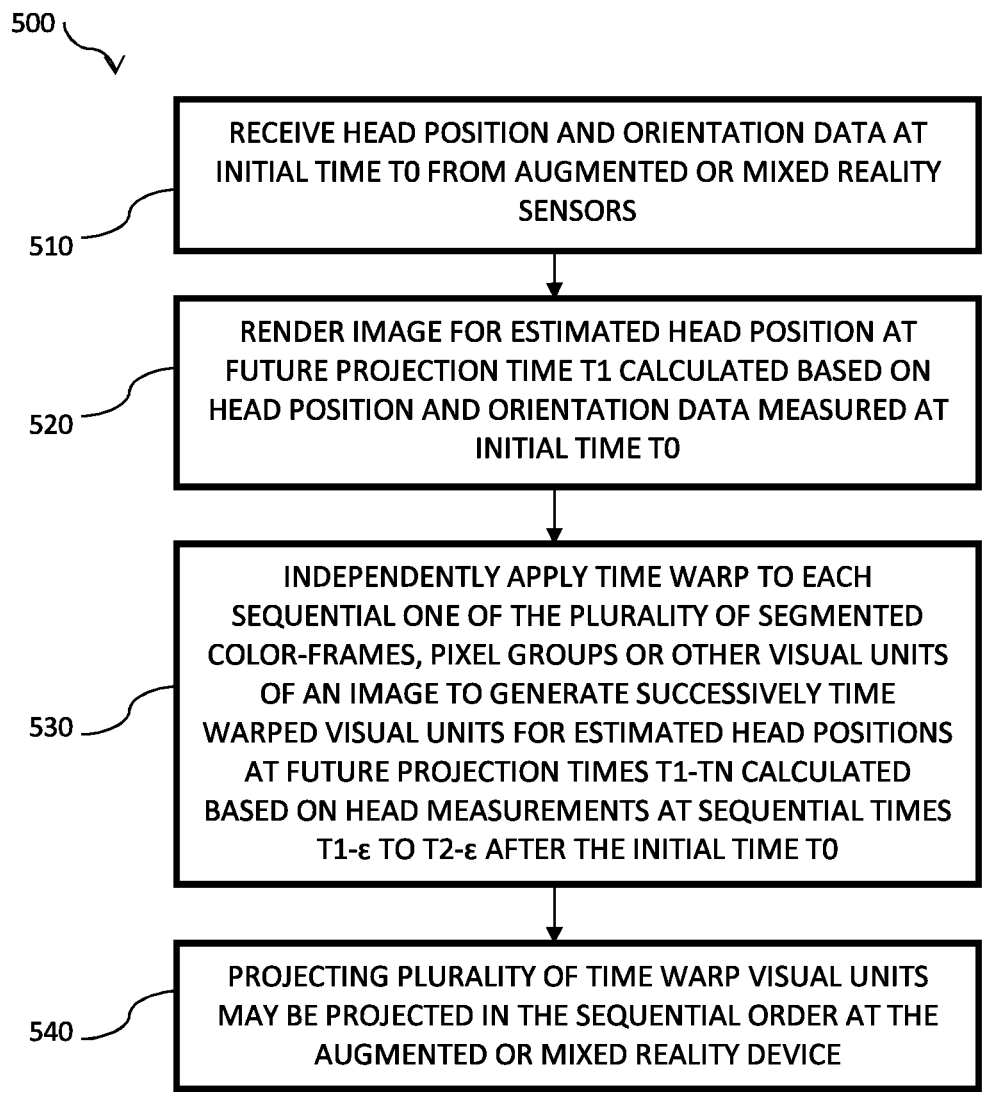
FIG. 5 is a flowchart of a method for applying time warp in an augmented or mixed reality environment in accordance with an embodiment of the invention.

Reference is made to FIG. 5, which is a flowchart of a method 500 for applying time warp in an augmented or mixed reality environment, according to an embodiment of the invention. Method 500 may be executed by one or more processor(s) (e.g., described in reference to FIG. 2, or other processors or system components).

In operation 510, one or more processor(s) (e.g., operating position head tracker 112 of FIG. 2) may receive head position and orientation data from sensors (e.g., 104 of FIG. 2) operably connected to an augmented or mixed reality device (e.g., 102 of FIG. 2) for measuring head position and orientation at an initial time (e.g., t0).

In operation 520, one or more processor(s) (e.g., operating 3D renderer 114 of FIG. 2) may render an image corresponding to an estimated head position (e.g., predicted to occur at a future image projection time t1) calculated based on the head position and orientation measured at the initial time (e.g., t0). In some embodiments, the image may be rendered with an additional border area outside of the field of view corresponding to the head position and orientation at the initial time to potentially fill in image data in any region initially outside the display field of view in the rendered image and revealed by applying time warp. In some embodiments, the size of the additional border may be based on a maximum allowed head position and orientation change from the initial time to one or more of the sequential times or an average thereof. In some embodiments, the size of the additional border may be based on a head speed and a time between the initial time and a final one of the sequential times at which the visual units are projected. Additionally, or alternatively, the image may be rendered to have a higher resolution than a resolution of a screen onto which the plurality of time warp visual units are projected.

In operation 530, one or more processor(s) (e.g., operating time warp re-projector 122 of FIG. 2) may independently apply time warp to each sequential one of the plurality of segmented visual units of an image to generate a plurality of respective time warp visual units (e.g., output by time warp re-projector 122 of FIG. 2 and/or from N color display intervals of FIG. 3). The plurality of respective time warp visual units may correspond to a plurality of different respective estimated head position and orientations (predicted to occur at future image projection times t1, t2, t3, . . . , tN) calculated based on head position and orientations measured at a plurality of different respective sequential times (e.g., t1-ε, t2-ε, t3-ε, . . . , tN-ε, where ε is the time warp calculation duration) after the initial time (e.g., t0). In some embodiments, the head position and orientation for each time warp visual unit is estimated based on the associated sequential measurement time (e.g., t1-ε, t2-ε, t3-ε, . . . , tN-ε) that occurs a predetermined time warp calculation duration (e.g., ε) prior to the projection time for the time warp visual unit (e.g., t1, t2, t3, . . . , tN, respectively).

In some embodiments, the plurality of segmented visual units may include a plurality of monochromatic color-frames of the rendered image, where each monochromatic color-frame depicts a single color or color spectrum portion of the rendered image (e.g., color-frames Red1, Green2, Blue3, Red4, . . . of FIG. 1A). In some embodiments, the plurality of segmented visual units may include a plurality of pixel-groups of the rendered image, each pixel-group depicting a different spatial region of the rendered image (e.g., pixel-groups PG1, PG2, PG3, . . . , PGN in FIG. 1B, such as one or more pixel lines, squares, rectangles, quadrants or any other pixel segmentation).

In some embodiments, operation 530 may include two or more phases. In an initial phase, one or more processor(s) (e.g., operating buffers 120a and 120b of FIG. 2) may store the rendered image comprising the plurality of segmented visual units and in a subsequent phase, one or more processor(s) (e.g., operating time warp re-projector 122 of FIG. 2) may independently apply time warp to each sequential one of the plurality of segmented visual units.

In some embodiments, the plurality of segmented visual units may be stored in a standby or inactive buffer and then an active buffer (e.g., buffers 120a and 120b of FIG. 2). The active buffer may output the plurality of segmented visual units to be time warped for projecting in a current image iteration and the standby buffer may (e.g., in parallel or in the same iteration) input a new rendered image comprising the plurality of visual units to be projected in a subsequent image iteration. After the completion of an image iteration (e.g., rendering and/or processing of an image until its projection), the roles of buffers between active and standby may be switched or reversed to output for projection the plurality of time warp visual units loaded in the previous image iteration and to input a new plurality of visual units of a new image.

In operation 540, one or more processor(s) (e.g., operating display projector 110 of FIG. 2) may project the plurality of time warp visual units in the sequential order at the augmented or mixed reality device.

Other operations may be added, some operations may be omitted, and the order of operations may be rearranged in the method of FIG. 5.

Some embodiments of the invention may provide improvements to the field of augmented or mixed reality. In some embodiments, independently applying time warp to each individual one of the N color-frames, pixel-groups, or other visual units per image in an AR or MR environment may decrease the motion-to-photon latency by a factor of N (e.g., the number of visual units per image) as compared to conventional VR time warp executed once per image. In some embodiments, a time warp engine may update image frames and/or head position and orientations at a rate equal to the product of the image rate and the number of segmented units per image (e.g., yielding values upwards of 60 images per second×8 color-frames per image=greater than or equal to 480 time warps per second or approximately 2 ms for each time warp). In some embodiments, such high frequency time warp may reduce jitter and judder. In some embodiments, the motion-to-photon latency may be reduced to a minimum, e.g., of 4.5-5.5 ms. In some embodiments, an additional border (e.g., 404 of FIG. 4) may be appended to rendered images to eliminate no-data or black-out zones near the edges of time warped images. Other or additional benefits or improvements may be gained from various embodiments of the invention.

Although the discussion herein describes the use of augmented or mixed reality in a headset or "see-through" glasses, embodiments of the invention may be used with any augmented or mixed reality device, system or environment including, but not limited to, augmented or mixed reality glasses, headsets, contact lenses, holograms, screens, prisms, helmets, kiosks, projectors, or any other see-through material or device.

Although the discussion herein describes head position and orientation data, embodiments of the invention may be used with any head motion data (e.g., speed, velocity, acceleration, momentum, etc.).

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method of applying time warp in an augmented or mixed reality environment, the method comprising:
receiving head position and orientation data from sensors operably connected to an augmented or mixed reality device for measuring head position and orientation at an initial time;
rendering an image corresponding to an estimated head position calculated based on the head position and orientation measured at the initial time;
independently applying time warp to each sequential one of a plurality of segmented visual units of an image to generate a plurality of respective time warp visual units corresponding to a plurality of different respective estimated head position and orientations calculated based on head position and orientations measured at a plurality of different respective sequential times after the initial time; and
projecting the plurality of time warp visual units in the sequential order at the augmented or mixed reality device.

2. The method of claim 1, wherein the plurality of segmented visual units are a plurality of monochromatic color-frames of the rendered image, each monochromatic color-frame depicting a single color or color spectrum portion of the rendered image.

3. The method of claim 1, wherein the plurality of segmented visual units are a plurality of pixel-groups of the rendered image, each pixel-group depicting a different spatial region of the rendered image.

4. The method of claim 1 comprising applying time warp in multiple phases including:
in an initial phase, storing the rendered image comprising the plurality of segmented visual units; and
in a subsequent phase, independently applying time warp to each sequential one of the plurality of segmented visual units.

5. The method of claim 1 comprising:
in an active buffer, outputting the plurality of segmented visual units to be time warped for projecting in a current image iteration; and
in a standby buffer, inputting a new rendered image comprising the plurality of visual units to be projected in a subsequent image iteration.

6. The method of claim 5 comprising, after the completion of an image iteration, switching the roles of buffers between active and standby to output for projection the plurality of time warp visual units loaded in the previous image iteration and to input a new plurality of visual units of a new image.

7. The method of claim 1, wherein the image is rendered with an additional border area outside of the field of view corresponding to the head position and orientation at the initial time to fill in image data in a region initially outside the display field of view in the rendered image and revealed by applying time warp.

8. The method of claim 7, wherein the size of the additional border is based on a maximum allowed head position and orientation change from the initial time to one or more of the sequential times or an average thereof.

9. The method of claim 7, wherein the size of the additional border is based on a head speed and a time between the initial time and a final one of the sequential times at which the visual units are projected.

10. The method of claim 1, wherein the image is rendered to have a higher resolution than a resolution of a screen onto which the plurality of time warp visual units are projected.

11. The method of claim 1, wherein the head position and orientation for each time warp visual unit is estimated based on the associated sequential measurement time that occurs a predetermined time warp calculation duration prior to the projection time for the time warp visual unit.

12. The method of claim 1, wherein head position and orientation is measured using sensors selected from the group consisting of: cameras, depth sensors, magnetometers, gyroscopes, accelerometers, and inertial measurement units (IMUs).

13. A system for applying time warp in an augmented or mixed reality environment, the system comprising:
one or more processors configured to:
receive head position and orientation data from sensors operably connected to an augmented or mixed reality device for measuring head position and orientation at an initial time,
render an image corresponding to an estimated head position calculated based on the head position and orientation measured at the initial time, and
independently apply time warp to each sequential one of a plurality of segmented visual units of an image to generate a plurality of respective time warp visual units corresponding to a plurality of different respective estimated head position and orientations calculated based on head position and orientations measured at a plurality of different respective sequential times after the initial time; and
a projector to display the plurality of time warp visual units in the sequential order at the augmented or mixed reality device.

14. The system of claim 13 comprising two or more buffers of which at least one buffer is designated as active for outputting the plurality of segmented visual units to be time warped for projecting in a current image iteration and at least one other buffer is designated as standby for inputting a new rendered image comprising the plurality of visual units to be projected in a subsequent image iteration.

15. The system of claim 14, wherein after the completion of an image iteration, the one or more processors are configured to switch the designation of buffer roles between active and standby to output for projection the plurality of time warp visual units loaded in the previous image iteration and to input a new plurality of visual units of a new image.

16. The system of claim 13 comprising one or more sensors selected from the group consisting of: cameras, depth sensors, magnetometers, gyroscopes, accelerometers, and inertial measurement units (IMUs).

17. The system of claim 13, wherein the one or more processors are configured to apply time warp in multiple phases including:
in an initial phase, storing the rendered image comprising the plurality of segmented visual units, and
in a subsequent phase, independently applying time warp to each sequential one of the plurality of segmented visual units.

18. The system of claim 13, wherein the plurality of segmented visual units are a plurality of monochromatic color-frames of the rendered image, each monochromatic color-frame depicting a single color or color spectrum portion of the rendered image.

19. The system of claim 13, wherein the plurality of segmented visual units are a plurality of pixel-groups of the rendered image, each pixel-group depicting a different spatial region of the rendered image.

20. The system of claim 13, wherein the augmented or mixed reality device is selected from the group consisting of: glasses, headsets, contact lenses, holograms, screens, prisms, televisions, windows, kiosks, and projectors.

* * * * *